July 9, 1940. E. J. COOK 2,206,942
METHOD FOR RELATIVELY POSITIONING A TOOL AND A
WORK BLANK IN A REPRODUCING MACHINE
Filed March 6, 1939 5 Sheets-Sheet 1

FIG.1.

INVENTOR.
EVERETT J. COOK
BY
ATTORNEYS

July 9, 1940. E. J. COOK 2,206,942
METHOD FOR RELATIVELY POSITIONING A TOOL AND A
WORK BLANK IN A REPRODUCING MACHINE
Filed March 6, 1939 5 Sheets-Sheet 2

INVENTOR.
EVERETT J. COOK
BY
ATTORNEYS

INVENTOR.
EVERETT J. COOK
BY
ATTORNEYS

July 9, 1940.  E. J. COOK  2,206,942
METHOD FOR RELATIVELY POSITIONING A TOOL AND A
WORK BLANK IN A REPRODUCING MACHINE
Filed March 6, 1939   5 Sheets-Sheet 5

INVENTOR.
EVERETT J. COOK
BY
ATTORNEYS

Patented July 9, 1940

2,206,942

UNITED STATES PATENT OFFICE 2,206,942

METHOD FOR RELATIVELY POSITIONING A TOOL AND A WORK BLANK IN A REPRODUCING MACHINE

Everett J. Cook, Toledo, Ohio, assignor to H. H. Buggie & Company, Toledo, Ohio, a corporation of Ohio Application March 6, 1939, Serial No. 260,240

10 Claims. (Cl. 90—13)

This invention relates to a method and apparatus for relatively positioning a tool and a work blank in a reproducing machine of the type having a model with a shaded record thereon and having an optical scanning system including a light sensitive cell responsive to changes in contour of the model and variations in shade of the record to control relative movement of the work blank and tool.

It has been proposed to fashion a work blank to reproduce a replica of a model by scanning the model with an optical unit including a light sensitive cell responsive to changes in contour of the pattern and variations in shading of a record on the model to control relative movement of the work blank and cutting tool in a manner to fashion the work blank to form a replica of the model. In cases where it is desirable or essential to accurately reproduce the model to a predetermined dimension, it is necessary to compensate for the extent of cut of the tool effected by the shaded decoration when initially setting the tool relative to the work blank, otherwise an error is introduced equal to the variation in cut of the tool caused by the shading of the record on the model. It is, therefore, one of the principal objects of this invention to predetermine the depth of cut of the tool represented by the shaded record on the model and to compensate for this depth of cut by relatively positioning the tool and work blank preparatory to fashioning the latter. As a result, the finished product, while exactly resembling the model in appearance, is of accurate predetermined dimension.

The present invention finds particular utility in manufacturing molds for bottles and the like where it is essential to accurately form the mold to a predetermined cubic capacity so that the resulting bottle will possess the required volume. It is a fairly simple matter to determine the general capacity of the mold by displacing the model from which the mold is formed, but this procedure is of no value in determining the additional capacity effective by cutting a replica of the shaded record on the pattern in the mold. The problem of determining the additional capacity represented by the shaded record is complicated by reason of the fact that the depth of cut of the decoration in the mold varies as the shading of the record on the model varies. It is, therefore, another object of this invention to provide a method and apparatus rendering it possible to accurately predetermine the additional volume represented by the decoration or shaded record on the pattern, and to relatively position the tool and work blank to compensate for the additional volume created by the decoration so that the resulting mold will have the desired volume, regardless of the displacement of the model.

In accordance with this invention, successive areas of the surface of the model are scanned by an optical system including a light sensitive cell in a manner that the resistance of the cell varies as the light intensity reflected from the different areas of the model varies, and the resulting change in electrical current passing through the cell is measured by a meter, such as a microammeter. The readings of different areas scanned by the optical system are compared with readings previously noted from charts showing meter readings for unit areas of a shade which has been predetermined to effect a definite depth of cut of the tool in the work blank. For example, the meter reading for one area on the surface of the model scanned is noted and compared with the preformed chart to determine the number of square inches of the known shade this reading corresponds to, the known shade being the one referred to as effecting the definite depth of cut aforesaid. It follows, therefore, that the volume of the shaded record on the pattern may be accurately obtained by multiplying the depth of cut effected by the known shade by the sum of the unit areas corresponding to the various microammeter readings obtained from the model.

A further feature of this invention resides in the novel manner in which the tool and work blank are relatively positioned to accurately cut the blank to the predetermined dimension, regardless of the model displacement. In the present instance, the volume represented by the shaded record is added to the displacement volume of the model and subtracted from the predetermined desired volume of the mold. The result is divided by the area of the surface of the model, and this result represents the adjustment of the tool required to accurately form the mold to the predetermined desired volume.

In addition to the foregoing, the present invention contemplates relatively simple and inexpensive mechanism for carrying out the several steps of the improved method outlined above.

The foregoing, as well as other objects, will be made more apparent as this description proceeds, especially when considered in connection with the accompanying drawings, wherein.

For the purpose of illustrating one application of the improved method and apparatus forming the subject matter of this invention, I have selected a reproducing machine for fashioning a mold cavity in a work blank to the exact size and shape of the article it is desired to cast, although it will be understood as this description proceeds that the present invention is not limited to this specific application. As a matter of fact, the method and apparatus forming the subject matter of this invention may be advantageously employed in all cases where the accuracy of the resulting product necessitates compensating for the depth of cut represented by a shaded record to be reproduced on or in the work blank.

Figure 1:
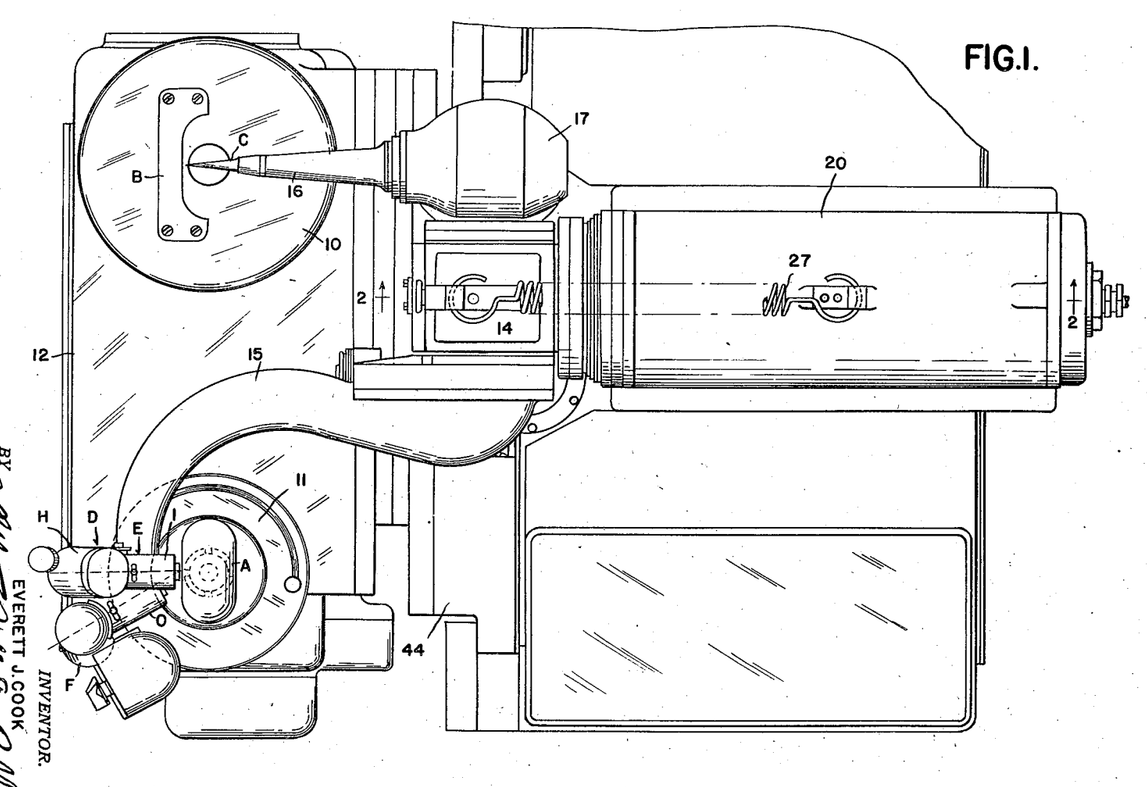
Figure 1 is a top plan view of a portion of a reproducing machine to which my improved method and apparatus is applicable.

Inasmuch as the reproducing machine shown herein is solely for the purpose of illustrating one typical application of my improved method and apparatus, it is not believed necessary to describe the same in detail. In general, it will be noted from Figure 1 that the machine comprises a work support 10 and a pattern support 11 mounted in side by side relationship on a traversing carriage 12 for oscillation by mechanism (not shown herein), but which may be the same as illustrated in my Patent No. 2,154,974, dated April 18, 1939. A pattern A having a shaded record A' thereon is mounted on the support 11 for oscillation therewith as a unit and a work blank B is secured to the support 10 for movement with the latter. The pattern corresponds to the article it is desired to cast in the mold cavity to be formed in the work blank B and is preferably formed of or coated with a material which is impenetrable by light. The shaded record A', on the other hand, may be a photograph, sketch, or print of the decoration or printing it is desired to apply to the article to be cast in the completed mold. However, particularly satisfactory results have been secured by forming a negative of the shaded record on stripping film in very much the same manner as is ordinarily practiced in photoengraving and, in case the record is in the form of a shaded sketch, a half-tone screen, similar to the one used in photoengraving, is preferably employed. Prior to placing the negative on the surface of the model, this surface is thoroughly cleaned and coated with a silver emulsion of the type commonly employed in photographing processes. The negative is then subjected to a bath of benzene and, after being placed on the model, is exposed to light. Upon completion of the proper exposure, the negatives are removed and a coating of ink is applied to the model in accordance with the electroplating practice. The emulsion is then developed and the unexposed parts are removed by a solution commonly known as "hypo", or some equivalent agent.

In the present instance, the outer half of the surface of the pattern A is scanned by an optical unit D and the latter controls the movements of a tool C positioned at the inner side of the work blank B opposite the latter. Both the tool C and optical unit D are mounted on the forward end of a ram 14 supported for reciprocation toward and away from the traversing carriage 12. The optical unit D is positioned opposite the pattern A at the outer side of the latter on an arm 15 having the inner end secured to the forward end of the ram so that movement of the ram in a direction toward the carriage 12 effects a corresponding movement of the optical unit D away from the pattern A. The tool C, on the other hand, is mounted on a spindle 16 driven by an electric motor 17 secured directly to the ram so that movement of the latter toward the carriage 12 effects a movement of the tool C toward the work blank B. In other words, the arrangement is such that the tool C is fed into the work by the ram 14 when the optical unit D is moved by the ram away from the pattern A.

Figure 2:
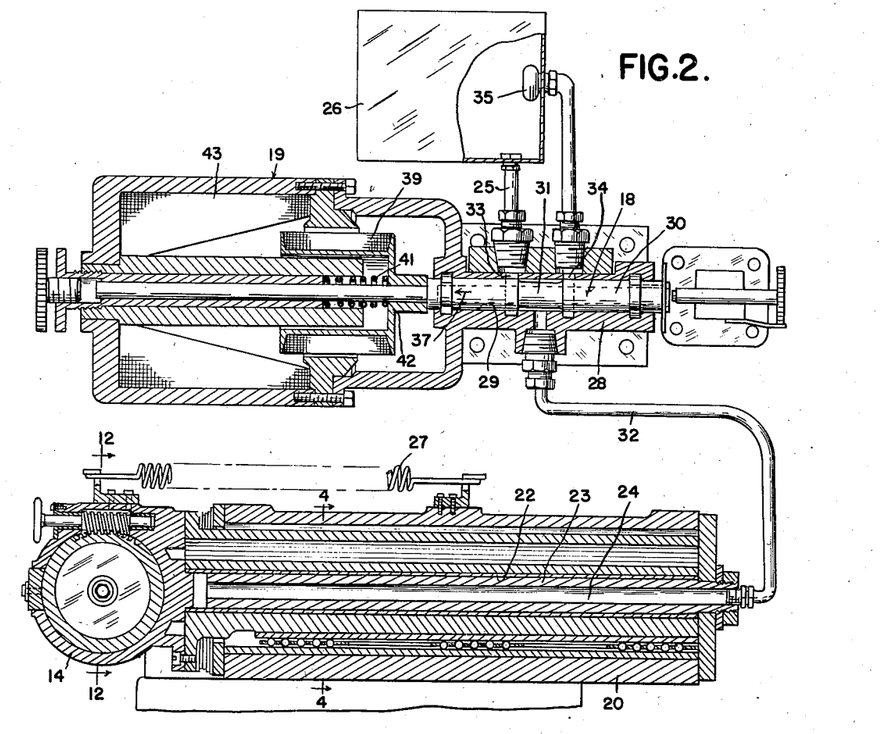
Figure 2 is a sectional view taken substantially on the plane indicated by the line 2—2 of Figure 1.
Figure 4:
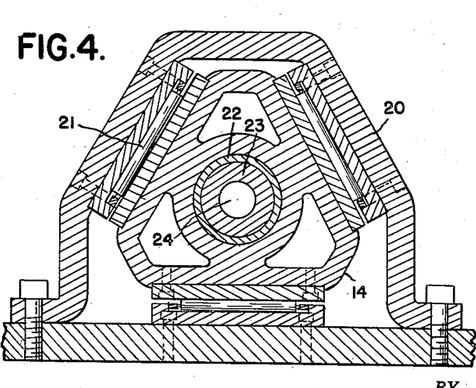
Figure 4 is a sectional view taken substantially on the plane indicated by the line 4—4 of Figure 2.

Upon reference to Figure 2, it will be noted that the ram 14 is operated by fluid pressure in dependence upon the operation of a valve 18 controlled by an electromagnet 19. The particular construction of the ram illustrated herein is the same in construction as the one shown in my Patent No. 2,176,666, dated October 17, 1939, and forms no part of this invention. Briefly described, the ram is triangular in cross section and slides in a casing 20 corresponding to the ram in cross section, as shown in Figure 4. A set of needle bearings 21 is supported between the opposed parallel walls of the ram 14 and casing 20 to reduce friction to a minimum. In addition, the ram is provided with a cylinder 22 slidably receiving a piston 23, which is fixedly secured to the frame of the machine against movement and is axially bored to provide the passage 24 therethrough. The rear end of the bore or passage 24 alternately communicates with a source of fluid under pressure 25 and a fluid supply tank 26 through the valve 18. The inner end of the cylinder 22 is closed by and is secured to the head of the ram so that fluid under pressure supplied to the cylinder 22 through the passage 24 in the piston 23 effects a movement of the head together with the cylinder in a direction toward the traversing carriage 12. On the other hand, when the pressure in the passage 24 is exhausted by the valve 18, the ram is moved in the opposite direction by a suitable spring 27.

The valve 18 comprises a casing 28 having a bore 29 therethrough for slidably receiving a valve plunger 30. The valve plunger 30 is formed with a reduced portion 31 intermediate the ends thereof arranged in constant communication with the rear end of the passage 24 through the piston 23 by a conduit 32 and respectively establishes communication between the bore or passage 24 and ports 33 and 34 as the plunger 30 moves in opposite directions from the neutral position shown in Figure 2. The port 34 communicates with the discharge side of a suitable pump 35 located within a fluid supply tank 26 and the port 33 communicates with the tank 26. The arrangement is such that movement of the plunger 30 in the direction of the arrow 37 from the position shown in Figure 2 establishes communication between the passage 24 and the port 33 communicating with the supply tank 26. As a result, fluid pressure is exhausted from the ram and the latter is moved in a direction away from the traversing carriage 12 or, in other words, the tool C is withdrawn from the work and the optical unit D is moved toward the pattern A. Of course, movement of the valve plunger 30 in a direction opposite the direction of the arrow 37 establishes communication between the passage 24, through the piston 23, and the port 34 communicating with the pump 35. As a result, fluid under pressure is built up in the passage 24 and the ram is moved by fluid pressure against the action of the spring 27 in a direction to feed the tool C into the work B and to move the optical unit away from the pattern A.

In the illustrated embodiment of the invention, the valve plunger 30 is moved in a direction to withdraw the tool from the work by energizing a load coil 39 of the electromagnet 19 and is moved in the opposite direction to effect feeding of the tool into the work by a spring 41 acting on the armature 42 of the electromagnet to resist movement of the load coil 39 into the magnetic field 43.

The operation of the electromagnet is controlled by the optical unit D in accordance with changes in shape of the surface of the pattern scanned and in dependence upon variations in shading of the record A' on the pattern A. The optical unit D comprises a light projector E and a light sensitive cell device F supported on the arm 15 in fixed angular relation to the projector. The light projector E has a source of illumination G housed by a casing H and registering with the outer end of a lens barrel I having condenser lenses J secured in the outer end thereof and having objective lenses K secured in the inner end of the same. A plate or diaphragm M is located between the two lenses and is formed with a slot L therethrough of a shape predetermined to cast an illuminated image on the surface of the pattern A having a sharply defined contour line N.

Figure 3:
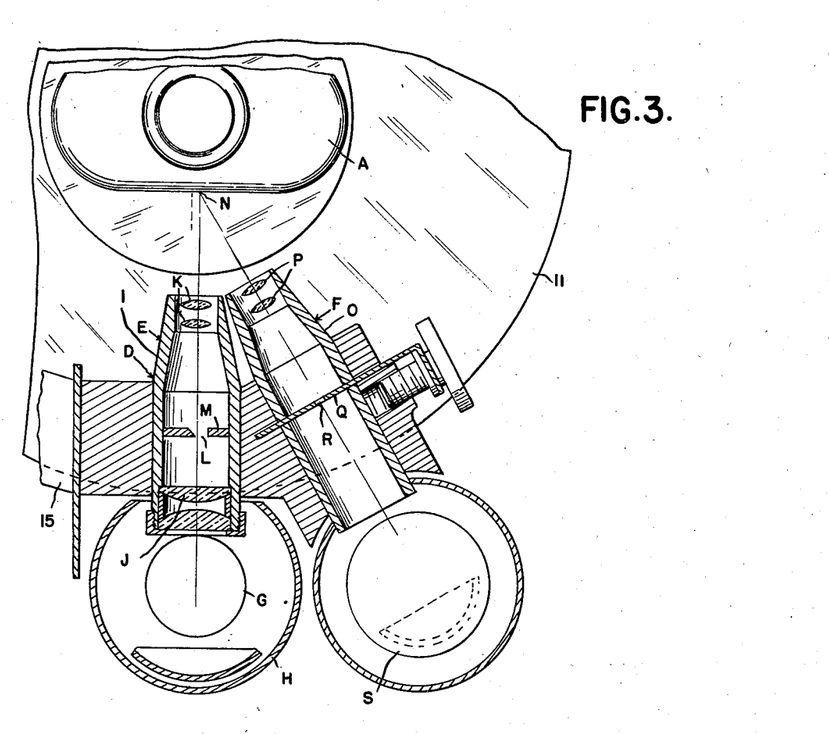
Figure 3 is a semi-diagrammatic sectional plan view of the optical system employed to scan the pattern.

The photoelectric cell device F is also provided with a lens barrel O having its axis in a common horizontal plane with the axis of the projector lens barrel I and having objective lenses P fixed in the inner end thereof. The axis of the lens barrel O converges toward the axis of the projector lens barrel I and intersects the latter axis at a point spaced inwardly beyond the inner ends of the lens barrels for reasons to be more fully hereinafter set forth. In addition, the photoelectric cell device F is provided with a light sensitive cell in the form of a phototube S supported in a suitable light tight casing joined with the outer end of the lens barrel O to receive light passing through the latter. In this connection, it will be noted from Figure 3 that a plate Q is secured in the lens barrel O between the lenses P and the light sensitive cell S. This plate Q is provided with a restricted aperture R therethrough located substantially on the axis of the lens barrel O and may be properly termed the line of sight of the phototube S since the latter is affected only by the light escaping through the aperture R.

It has previously been stated that the axis of the projector lens barrel I and the axis of the phototube lens barrel O are arranged in fixed angular relationship. The angle between these two axes is so determined that when the tool is properly set with reference to the work blank B, the axes of the lens barrels intersect at the surface of the pattern A or, in other words, the aperture R straddles the contour line N of the image reflected from the pattern on the plate Q.

The entire surface of the pattern A to be reproduced in the work blank B is, of course, scanned by the optical unit D and exactly the same area of the work blank is necessarily traversed by the tool C. As stated above, the pattern support and work support are mounted on the traversing carriage 12. This carriage is movable back and forth by mechanism, not shown herein, and is also fed vertically by a carriage 44, generally shown in Figure 1. The carriage 44 is raised by a step by step movement and the means for accomplishing this result is not shown herein, but may be similar to the means provided for this purpose in my Patent No. 2,154,974, dated April 18, 1939. Reference has also been made to the fact that the work blank B and pattern A are oscillated about their vertical axes. This is particularly desirable in cases where the sides of the article to be formed are on a radius in that it renders it possible to maintain the tool substantially normal to the surface being cut.

With the above in mind and remembering that the angle between the light beam and line of sight of the light sensitive cell remains constant throughout the traversing operation, it follows that as the surface of the pattern A approaches the optical unit D, the image reflected on the plate Q is shifted relative to the aperture R in a direction to diminish the intensity of light passing through the aperture R to the light sensitive cell S. Such action has the effect of reducing the current flowing through the load coil 39 of the electromagnet 19 to such an extent that the spring 41 operates the valve 18 to supply fluid pressure to the passage 24 in the ram 14 and effect movement of the ram 14 in a direction to feed the tool C into the work. It will, of course, be understood that movement of the tool C in the above direction causes a corresponding movement of the optical unit D away from the pattern and this movement continues until the aperture R intercepts the illuminated portion of the image. As the intensity of light passing through the aperture R is increased by interception of the aperture R with the illuminated portion of the image, the quantity of current flowing through the load coil of the electromagnet 19 is correspondingly increased and becomes sufficient to counteract the spring 41 and operate the valve 18 to permit movement of the ram 14 in a direction to withdraw the tool C from the work by the spring 27. As a result, the aperture R is maintained in straddling relationship with the contour line N and, since this contour line represents a section of the pattern as viewed from the light sensitive cell S, it follows that an exact replica of the surface of the pattern scanned is produced in the work blank B.

Having described the manner in which the shape of the surface of the pattern scanned is exactly reproduced in the work blank B, reference will now be made to the manner in which variations in shade of the record A' affect the tool. Assuming, for the purpose of illustration, that the record is in the form of the sketch, shown in Figure 5, as having light and dark portions 45 and 46, it will be noted that when the dark or shaded portions 46 of the sketch are scanned by the light sensitive cell S, the light intensity intercepted by the cell is diminished sufficiently to effect the drop in current flowing through the cell required to permit the spring 41 to operate the valve 18 and effect movement of the ram 14 by the action of fluid pressure in a direction to cause the tool to feed into the work. On the other hand, when the light portions 45 of the sketch are scanned by the cell S, the intensity of light intercepted by the photocell S is increased sufficiently to effect the increase in current flow through the cell S required to counteract the spring 41 and operate the valve 18 to permit movement of the ram 14 by the spring 27 in a direction to withdraw the tool from the work. The arrangement is such that the decoration represented by the sketch is cut into the mold while the latter is shaped to the contour of the pattern.

Figure 5:
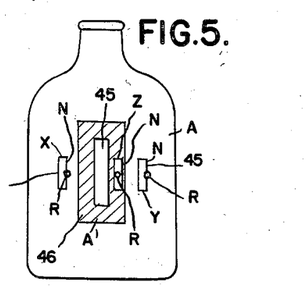
Figure 5 is an elevational view of the pattern employed in the reproducing machine illustrated in Figure 1.

In order to better illustrate the manner in which the tool is controlled by both the contour of the surface of the pattern A and variations in shading of the record A', attention is directed to Figure 5, wherein three positions of the light image cast by the projector on the surface of the pattern are shown with reference to the aperture R of the light sensitive cell S. In the two positions X and Y, the tool is controlled in accordance with the contour of the pattern in the manner set forth above and in the position Z the tool is controlled in accordance with variations in the shading of the record A'. Assuming that the light image is in the position Z, it will be noted that the intensity of light escaping through the aperture R onto the cell S is reduced by an amount depending upon the depth of shade of the portion of the record scanned and, as a result, the current passing through the photocell S is correspondingly reduced. This reduction in current admits fluid under pressure into the passage 24 in the ram to feed the tool into the work to an extent depending upon the degree of shade of the record, or upon the drop in current flow through the cell S, and correspondingly moves the optical unit D away from the pattern to bring a greater area of the aperture R in registration with the illuminated portion of the image. Accordingly, as soon as the image and aperture R reach the position Y, the intensity of light passing through the aperture R onto the photocell S increases and causes the optical unit D to move toward the pattern A and the tool to move in a direction away from the work B. As a result, the area of the aperture R intercepting the illuminated portion of the image is reduced by an amount depending upon the extent of increased light intensity. It will be understood from the above that the relationship between the aperture R and contour line N varies in dependence upon variation in the shading of the light reflecting surface of the model.

It may be pointed out that the current flowing through the light sensitive cell S is amplified by an amplifier of the general type illustrated and described in my copending application Serial No. 261,606 filed March 13, 1939. This amplifier is so balanced that the wattage in the output circuit controlling the electromagnet 19 increases and decreases as the light intensity reflected from the pattern increases and decreases. In other words, the depth of cut of the tool C will vary in dependence upon variations in the shading of the record A' on the pattern A.

*Method of predetermining volume represented by the shaded record*

When the reproducing machine described above is employed for the purpose of fashioning a bottle mold, for example, it is necessary to form the mold with such a high degree of accuracy that the displacement of the mold will come within very close limits to a specified volume. The approximate volume of the mold may be readily determined by displacing the model in a liquid. However, this procedure will not include the volume of the decoration to be cut in the mold or, in other words, does not embody the volume represented by the shaded record A' on the pattern A. In cases where the decoration covers a substantial area of the mold, the volume represented by the shaded record becomes an important item and, unless taken into consideration, will result in an error of substantial proportions in the completed mold. The present invention not only provides a relatively simple method of accurately obtaining the additional volume represented by the decoration or shaded record, but also includes the manner in which the resulting calculation may be employed to effect the necessary adjustment of the tool to compensate for this additional volume.

In accordance with the present invention, the approximate volume of the mold is determined by displacing the model in a liquid, such as water, and this volume will be referred to for convenience as $ab$. Upon completion of this operation, the model is introduced to the apparatus shown in Figure 6 and successive portions of the area of the surface of the model scanned by the optical system D are scanned by a second optical system 50 in a manner to be more fully hereinafter set forth. The second optical system also includes a light sensitive cell 51 arranged to intercept light reflected from the model in a manner that the resistance of the cell varies as the light intensity reflected from the different areas of the model varies. The resulting variations in electrical current flowing through the light sensitive cell 51 are amplified by an amplifier 52 having a microammeter 53 in the output circuit thereof so that the light intensity of each area of the model scanned by the light sensitive cell 51 may be read in terms of microamperes on the meter 53.

Figures 11, 12:
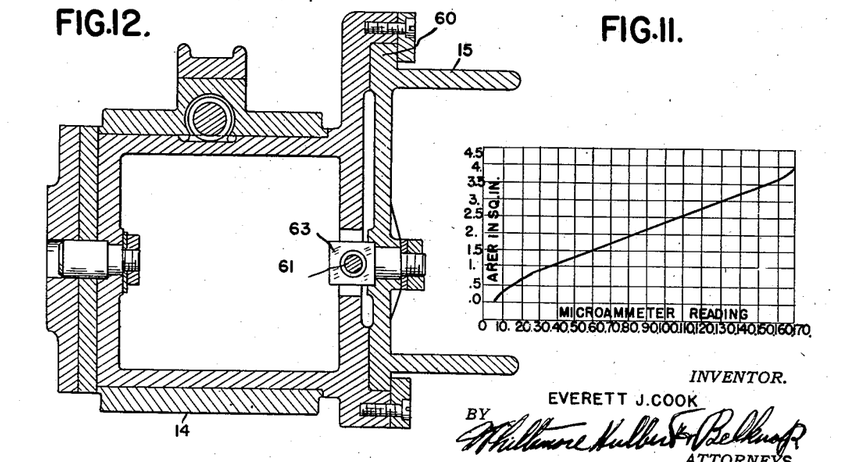
Figure 11 is a diagrammatic view illustrating a chart used in the present method.
Figure 12 is a sectional view taken substantially on the plane indicated by the line 12—12 of Figure 2.

The meter reading for each area scanned by the light sensitive cell 51 is noted and compared with a preformed chart (shown in Figure 11) to determine the number of square inches of the standard shade this reading corresponds to. Referring more in detail to Figure 11, it will be noted that this figure illustrates a curve obtained by recording microammeter readings for different unit areas of a shade which has been found to effect a predetermined depth of cut $dc$ when scanned by the light sensitive cell D. In this connection, it will be noted that the ordinates of the chart, illustrated in Figure 11, represent readings on the microammeter of the known or standard shade, and the abscissas of the chart represent the number of square inches of the standard shade used in obtaining the readings on the microammeter.

With the chart shown in Figure 11, it is a simple matter to take the microammeter readings obtained by successively scanning different areas of the model and interpret these readings in the equivalent number of square inches of the standard shade referred to above as effecting the depth of cut dc. For example, assuming that the microammeter reading for one area on the model is 30, it will be noted from the curve illustrated in Figure 11 that this reading corresponds to the reading obtained by scanning approximately one square inch of the standard shade. This procedure is employed for each microammeter reading and the volume represented by the shaded record may be readily determined by multiplying the sum of the readings, taken from the abscissas of the chart, by the known depth of cut effected by the standard shade referred to above. For example, assuming that the depth of cut dc, effected by the standard shade, is .020 of an inch and assuming that the sum of the square inches of standard shade corresponding to the model readings is 37½ square inches, it will be noted that the volume represented by the shaded record is equal to 37½ multiplied by .020. The result of this calculation is ¾ cubic inch, and by adding this figure to the approximate volume ab which will be assumed as 62 cubic inches, the actual volume 62¾ cubic inches of the model is obtained.

After the additional volume represented by the shaded record is predetermined and added to the displacement volume of the model, the tool C is adjusted relative to the work blank support 11 to not only compensate for this additional volume but, at the same time, to take up any difference that may exist between the specified volume of the mold and the sum of the model displacement and volume represented by the shaded record. Assuming that the specified volume of the mold is 62½ cubic inches, it will be noted that the tool C must be adjusted relative to the work support so that it will fashion the work to provide a volume of 62½ cubic inches, instead of 62¾ cubic inches. In other words, it will be necessary to subtract ¼ cubic inch from the calculated volume of 62¾ cubic inches by adjusting the tool C relative to the work support. This is accomplished by determining the area of the surface of the model and dividing ¼ cubic inch by this area. Assuming that the area of the model is 50 square inches, it follows that the tool must be retracted from its normal setting .005 of an inch so that the mold cavity in the work blank will be cut .005 of an inch shallower than the depth of cut indicated by the normal setting of the tool. One method that has been found satisfactory for determining the area of the model consists in wrapping the model in tinfoil and cutting the tinfoil into pieces that can be measured easily with a planometer. It follows from the above that regardless of the dimensions of the model and irrespective of the shaded record on the model, the mold will be cut to the specified capacity.

Figure 8:
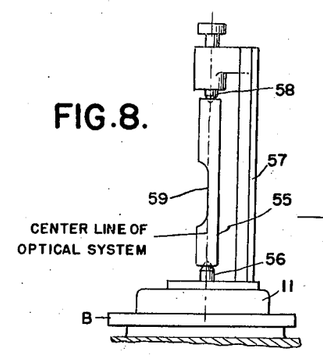
Figure 8 is a side elevational view, partly in section, illustrating the mounting of a gauge employed in initially setting the tool relative to the work blank.
Figure 9:
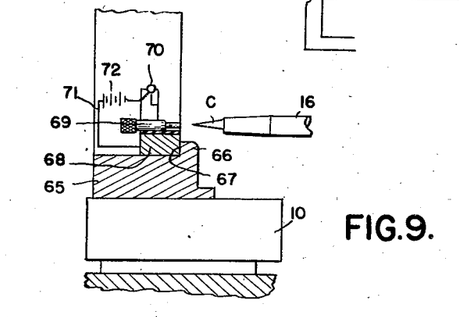
Figure 9 is a sectional view disclosing the means for accurately positioning the tool relative to the work blank.

In Figures 8 and 9, I have shown the manner in which the tool is initially set and also the means employed for accurately compensating for any difference between the specified volume of the mold and the calculated volume of the latter. In initially setting the tool relative to the work, a gauge 55 is mounted on the model support 11 prior to positioning the model A on this support. As shown in Figure 8, the lower end of the gauge 55 is positioned by a fixed center 56 carried by the model holder 57 and the upper end of the gauge is positioned by a movable center 58 slidably supported on the model holder 57. The portion of the outer surface of the gauge scanned by the optical unit D is recessed to provide a surface 59 in a plane including both the axis of oscillation of the support 11 and the axis of oscillation of the work support 10.

In accordance with the present construction, when the aperture R of the light sensitive cell S intersects the contour line N of the image on the surface 59 of the gauge, the tool C is adjusted so that the cutting end thereof assumes a predetermined position with respect to the plane aforesaid. In the present instance, the tool C is properly adjusted relative to the plane aforesaid by adjusting the arm 15 relative to the ram 14 in the direction of movement of the ram. For reasons hereinbefore described, the optical unit D remains a fixed distance from the adjacent surface of the model or gauge 55 and, accordingly, any adjustment of the arm in a direction toward the ram will effect a movement of the tool C toward the work support 11 by the fluid pressure while any adjustment of the arm in the opposite direction effects a movement of the tool C away from the work support 11. In detail, it will be noted from Figure 12 that the arm 15 is slidable in ways 60 extending in the direction of movement of the ram 14 and carried by the head of the ram at one side of this head. A screw 61 is rotatably supported on the ram 14 and threadedly engages a nut 63 fixedly secured to the arm 15. As a result, rotation of the screw 61 effects a sliding movement of the arm 15 relative to the ram 14 in one direction or the other, depending upon the direction of rotation of the screw. Thus, by moving the arm 15 relative to the ram, the tool is moved either toward or away from the plane including the axes of the supports 10 and 11.

In Figure 9, I have illustrated means for accurately positioning the cutting end of the tool prior to securing the work blank to the support 10. In detail, a work clamping fixture 65 is secured to the support 10 and is provided with an upwardly extending lip 66 having a vertical shoulder 67 machined to lie in the same plane previously described as including the axis of rotation of the work support 10 and the axis of rotation of the pattern support 11. In setting the tool C, a straight edge 68 is mounted on the fixture 65 against the shoulder 67 and this straight edge is provided with a micrometer, diagrammatically illustrated by the reference character 69 on the top surface thereof opposite the cutting end of the tool C. The micrometer 69 is accurately adjusted to position the cutting end of the tool in proper relationship to the plane of the shoulder 67. In the specific example given above, the micrometer is adjusted to project .005 of an inch beyond the plane toward the tool so that the mold cavity will be cut .005 of an inch shallower than would be the case if the micrometer were adjusted to assume a position in the plane of the shoulder 67.

It follows from the above that the first step in adjusting the tool is to properly set the micrometer with reference to the plane aforesaid. The arm 15 is then adjusted relative to the ram until the cutting end of the tool engages the micrometer 69.

In order to simplify the adjustment and render the same accurate, a signal 70 is provided for indicating the interval the cutting end of the tool engages the micrometer 69. In the present instance, the signal 70 is in the form of an electric light bulb connected in a circuit 71 with a source of electrical supply 72. One end of this circuit is connected to the micrometer which is insulated from the straight edge 68, and the other end of the circuit is grounded on the machine. As a result, the tool C and micrometer 69 cooperate to form a switch in the circuit so that when the tool C engages the micrometer, the light 70 will be illuminated, indicating that the proper setting of the tool has been accomplished.

The accuracy of the setting is further increased by employing a gauge 55 formed of, or coated with the same material as the model. In this connection, it will be noted that although the material is substantially impenetrable by light, nevertheless, any penetration of light will, of course, affect the setting of the tool and by forming the gauge of the same material as the model, this error is automatically compensated for.

Apparatus for determining the volume represented by the shaded record

Figure 6:
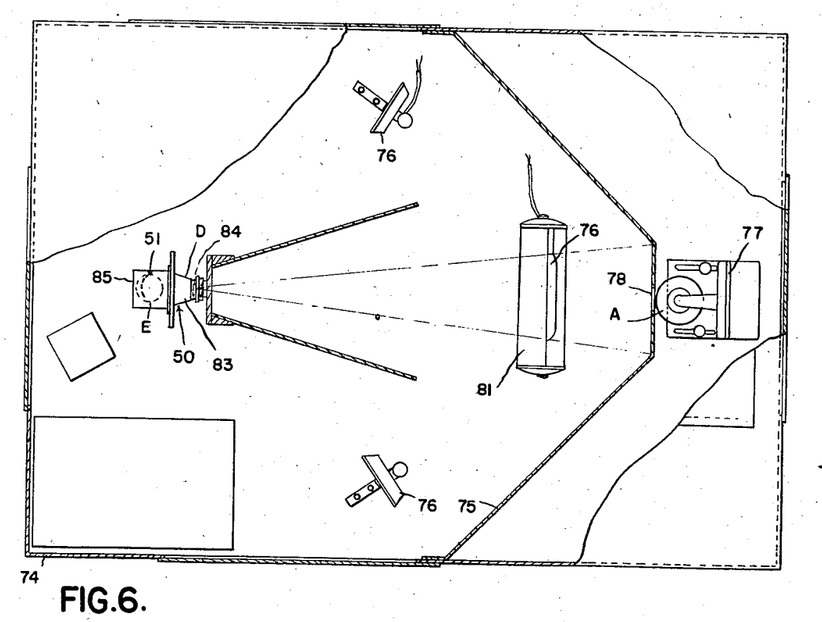
Figure 6 is a plan view, partly broken away, of novel apparatus employed in carrying out the method.
Figure 7:
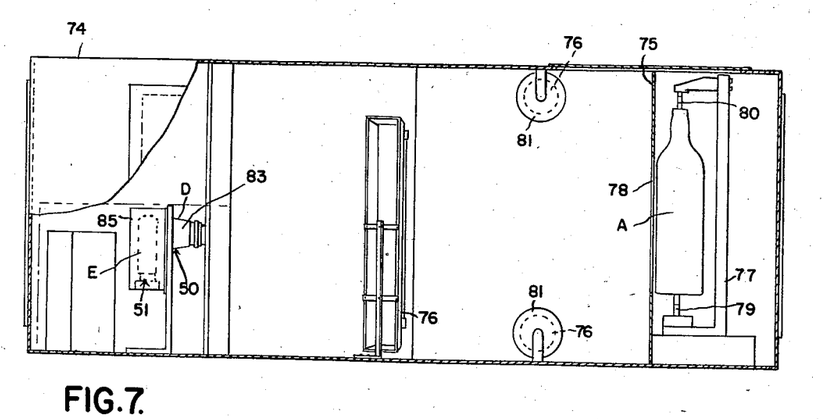
Figure 7 is a side elevational view, partly in section, of the construction shown in Figure 6.

In Figures 6 and 7, I have illustrated one type of apparatus that may be successfully used in determining the volume represented by the shaded record. In detail, the reference character 74 illustrates a light tight box or cabinet having the inner walls preferably painted to provide a coating which will not reflect light and having a screen 75, either formed of a material, or painted so that no light will be reflected therefrom. The interior of the box 74 at one side of the screen 75 is illuminated by a series of lamps, designated by the reference character 76 and the optical unit 50, previously referred to, is located in the box at the same side of the screen.

Figure 10:
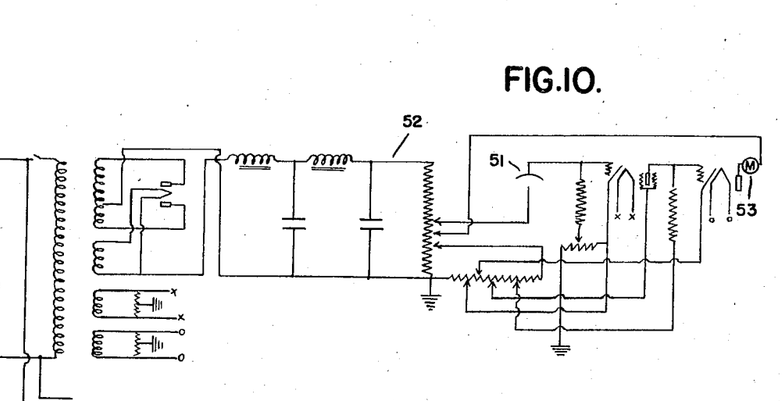
Figure 10 is a diagram of an electrical circuit employed in the apparatus shown in Figure 6.

Mounted in the box 74, at the opposite side of the screen, is a support 77 for the model A to be used in forming the mold and the screen 75 is formed with an elongated relatively narrow aperture 78, opposite the model A. The aperture extends for substantially the full length of the critical dimension of the model and is shown in the specific embodiment of this invention as extending from the base of the neck of the bottle to the bottom of the latter. As a result, light entering the aperture 78 from the lamps 76 is reflected from the model through the aperture toward the optical unit D. In this connection, it will be noted that reflectors 81 are associated with the lamps to reflect the light toward the aperture 78 and prevent light from being cast directly from the lamps toward the optical unit. The optical unit 50 is provided with a lens barrel 83 equipped with a lens system 84 for focusing light reflected through the aperture 78 from the model on the light sensitive plate of the photoelectric cell 51. The photoelectric cell 51 is housed in a casing 85 communicating with the end of the lens barrel to permit the light from the model to be intercepted by the cell. The resistance of the photoelectric cell 51 varies in dependence upon variations in the intensity of light from the surface of the model A through the aperture 78 and the electrical current flowing through the cell is amplified by the amplifier 52, shown in Figure 10 as having the microammeter 53 in the output circuit thereof. It follows from the above that variations in current flowing through the light sensitive cell in accordance with changes in the intensity of light reflected from the surface of the pattern A through the aperture 78 are indicated by the microammeter 53.

The model A is rotatably supported behind the screen 75 on centers 79 and 80 and is rotated by a step by step movement to bring successive portions of the surface of the model in registration with the aperture 78. Although any suitable means may be provided for intermittently rotating the model, I have found that more satisfactory results are obtained by manually rotating the same.

With the above apparatus, it will be noted that successive portions of the surface of the model containing the shaded record are scanned by the optical system 51 and during the intervals of rest of the model, the intensity of reflected light is noted in terms of microamperes from the meter 53. These readings are then compared with the chart shown in Figure 11 and the additional volume represented by the shaded record is determined in accordance with the foregoing method.

What I claim as my invention is:

1. In the method of accurately fashioning a work blank in a reproducing machine wherein a shaded record is scanned by a light sensitive cell responsive to variations in shading of the record to relatively move a tool and a work blank toward and away from each other, those steps which consist in predetermining the extent of relative movement of the tool and work blank caused by the shaded record, and relatively adjusting the tool and support for the work blank to compensate for said predetermined extent of movement.

2. In the method of accurately fashioning a work blank in a reproducing machine wherein a shaded record is scanned by a light sensitive cell responsive to variations in shading of the record to relatively move a tool and a work blank toward and away from each other to cut a replica of the shaded record in the work blank, those steps which consist in predetermining the volume represented by the shaded record, and initially setting the tool to compensate for this volume.

3. In the method of fashioning a cavity in a work blank to a specified volume in a reproducing machine wherein a pattern carrying a shaded record is scanned by a light sensitive cell responsive to changes in contour of the pattern as well as variations in shading of the record to relatively move the tool and work blank toward and away from each other, those steps which consist in initially relatively adjusting the tool to insure the depth of cut of the tool required to accurately fashion the cavity to a specified cubic inch displacement, predetermining the volume represented by the shaded record, and compensating for this additional volume when adjusting said tool.

4. In the method of accurately fashioning a work blank in a reproducing machine wherein a shaded record is scanned by a light sensitive cell responsive to variations in shading of the record to relatively move a tool and a work blank toward and away from each other to cut a replica of the shaded record in the work blank, those steps which consist in determining the intensity of light reflected from the surface of the pattern scanned by the light sensitive cell, determining the area of a shade known to effect a predetermined depth of cut that the value obtained from the preceding step corresponds to, determining the volume of the shaded record by multiplying the area by the predetermined depth of cut aforesaid, and relatively positioning the tool and work blank support to compensate for the volume represented by the shaded record.

5. In the method of fashioning a cavity in a work blank to a specified volume in a reproducing machine wherein a pattern carrying a shaded record is scanned by a light sensitive cell responsive to changes in contour of the pattern as well as variations in shading of the record to relatively move the tool and work blank toward and away from each other, those steps which consist in determining the intensity of light reflected from the surface of the pattern scanned by the light sensitive cell, determining the area of a shade known to effect a predetermined depth of cut that the value obtained by the preceding step corresponds to, determining the volume of the shaded record by multiplying the area aforesaid by the predetermined depth of cut, adding the volume represented by the shaded record to the displacement of the model to obtain the total displacement represented by the model, determining the difference between the total displacement represented by the model and the specified volume of the cavity, and relatively positioning the tool and work blank support to compensate for this difference.

6. In the method of accurately fashioning an article from a work blank in a reproducing machine wherein a pattern with a shaded record thereon is scanned by a light sensitive cell and wherein the latter is responsive to changes in contour of the pattern as well as variations in shading of the record to relatively move the tool and work blank toward and away from each other, those steps which consist in determining the volume represented by the shaded record, adding this additional volume to the displacement of the model to obtain the total displacement represented by the model, determining the difference between the specified volume of the article and the total displacement represented by the model, and relatively positioning the tool and work blank support to compensate for this difference.

7. In the method of accurately fashioning a work blank in a reproducing machine wherein a shaded record is scanned by a light sensitive cell responsive to variations in shading of the record to relatively move a tool and a work blank toward and away from each other, those steps which consist in determining the intensity of light reflected from successive portions of the record scanned by the light sensitive cell, comparing the sum of the values obtained with a shade known to effect a cut of predetermined depth to determine the area of the known shade that the sum of said values corresponds to, determining the volume represented by the record by multiplying the predetermined depth of cut aforesaid by the area determined by the preceding step, and relatively positioning the work blank support and tool to compensate for this volume.

8. In the method of fashioning a cavity in a work blank to a specified volume in a reproducing machine wherein a pattern carrying a shaded record is scanned by a light sensitive cell responsive to changes in contour of the pattern as well as variations in shading of the record to relatively move the tool and work blank toward and away from each other, those steps which consist in determining the intensity of light reflected from successive portions of the surface of the pattern scanned by the light sensitive cell, comparing the sum of the values obtained with a shade known to effect a cut of predetermined depth to determine the area of the known shade that the sum of said values corresponds to, determining the volume represented by the record by multiplying the predetermined depth of cut aforesaid by the area determined by the preceding step, adding the volume represented by the shaded record to the displacement of the model, determining the difference between the volume of the cavity and the sum of the volume represented by the record and the displacement of the model, and relatively positioning the tool and work blank support to compensate for this difference.

9. In the method of accurately fashioning an article from a work blank in a reproducing machine wherein a pattern with a shaded record thereon is scanned by a light sensitive cell and wherein the latter is responsive to changes in contour of the pattern as well as variations in shading of the record to relatively move the tool and work blank toward and away from each other, those steps in the method which consist in determining the intensity of light reflected from the surface of the pattern scanned by the light sensitive cell, comparing the value obtained by the preceding step with a shade known to effect a predetermined depth of cut to determine the area of the known shade that the above value corresponds to, determining the volume represented by the shaded record by multiplying the predetermined depth of cut aforesaid by the area obtained by the preceding step, adding this volume to the displacement of the model to obtain the total displacement represented by the model, determining the difference between the total model displacement and the volume of the article, and relatively positioning the tool and work blank support to compensate for this difference.

10. In the method of accurately fashioning an article from a work blank in a reproducing machine wherein a pattern with a shaded record thereon is scanned by a light sensitive cell and wherein the latter is responsive to changes in contour of the pattern as well as variations in shading of the record to relatively move the tool and work blank toward and away from each other, those steps which consist in scanning successive portions of the surface of the model by a light sensitive cell responsive to light reflected from said surface and electrically connected to a meter for measuring current flowing through the cell, recording the meter readings from each portion of the model scanned and comparing the sum of the readings with a shade known to effect a predetermined depth of cut in the work blank to determine the area of the known shade that the sum of these readings corresponds to, determining the volume represented by the record by multiplying the predetermined depth of cut aforesaid by the area obtained by the preceding step, and relatively positioning the tool and work blank support to compensate for the volume represented by the shaded record.

EVERETT J. COOK.